United States Patent
Lassa et al.

(10) Patent No.: US 8,819,328 B2
(45) Date of Patent: Aug. 26, 2014

(54) CONTROLLER AND METHOD FOR PERFORMING BACKGROUND OPERATIONS

(75) Inventors: Paul A. Lassa, Cupertino, CA (US); David C. Brief, Modiin (IL)

(73) Assignee: SanDisk Technologies Inc., Plano, TX (US)

( * ) Notice: Subject to any disclaimer, the term of this patent is extended or adjusted under 35 U.S.C. 154(b) by 510 days.

(21) Appl. No.: 12/982,833

(22) Filed: Dec. 30, 2010

(65) Prior Publication Data

US 2012/0173792 A1   Jul. 5, 2012

(51) Int. Cl.
G06F 12/00 (2006.01)
G06F 9/48 (2006.01)
G06F 3/06 (2006.01)
G06F 12/02 (2006.01)

(52) U.S. Cl.
CPC ............ G06F 9/4843 (2013.01); G06F 3/0613 (2013.01); G06F 3/0688 (2013.01); G06F 3/0659 (2013.01); G06F 12/0246 (2013.01)
USPC ..... 711/103; 711/150; 711/167; 711/E12.008

(58) Field of Classification Search
CPC ... G06F 3/0613; G06F 3/0659; G06F 3/0688; G06F 3/0679; G06F 13/18; G06F 12/0246; G06F 9/4843; G06F 9/485; G06F 9/4831; G06F 9/4837
USPC .................. 711/103, 150, 167, 154, E12.001, 711/E12.008
See application file for complete search history.

(56) References Cited

U.S. PATENT DOCUMENTS 5,479,633 A * 12/1995 Wells et al. .................. 711/103
5,930,167 A    7/1999 Lee et al.
6,034,882 A    3/2000 Johnson et al.
6,145,048 A * 11/2000 Klein ............................ 710/264
6,185,122 B1   2/2001 Johnson et al.
6,230,233 B1   5/2001 Lofgren
6,420,215 B1   7/2002 Knall et al.
6,553,476 B1 * 4/2003 Ayaki et al. .................. 711/204
6,594,183 B1   7/2003 Lofgren
6,631,085 B2  10/2003 Kleveland et al.

(Continued)

FOREIGN PATENT DOCUMENTS

WO   WO 2009/088920    7/2009
WO   WO 2010/079535    7/2010

OTHER PUBLICATIONS

International Search Report and Written Opinion for PCT/US2011/059366, dated Feb. 24, 2012, 10 pages.

(Continued)

*Primary Examiner* — Michael Krofcheck
(74) *Attorney, Agent, or Firm* — Brinks Gilson & Lione

(57) ABSTRACT

The embodiments described herein provide a controller and method for performing a background commands or operations. In one embodiment, a controller is provided with interfaces through which to communicate with a host and a plurality of flash memory devices. The controller contains a processor operative to perform a foreground command received from the host, wherein the processor performs the foreground command to completion without interruption. The processor is also operative to perform a background commands or operations stored in the controller's memory, wherein the processor performs the background command until completed or preempted by a foreground command. If the background command is preempted, the processor can resume performing the background command at a later time until completed.

26 Claims, 8 Drawing Sheets

(56) References Cited

U.S. PATENT DOCUMENTS

| | | |
|---|---|---|
| 6,741,502 B1 | 5/2004 | Cernea |
| 6,839,826 B2 | 1/2005 | Cernea |
| 6,988,175 B2 | 1/2006 | Lasser |
| 7,012,835 B2 | 3/2006 | Gonzalez et al. |
| 7,081,377 B2 | 7/2006 | Cleeves |
| 7,171,536 B2 | 1/2007 | Chang et al. |
| 7,224,607 B2 | 5/2007 | Gonzalez et al. |
| 7,281,086 B1 * | 10/2007 | More et al. ............... 711/112 |
| 7,366,029 B2 | 4/2008 | Kagan |
| 7,379,330 B2 | 5/2008 | Conley et al. |
| 7,447,066 B2 | 11/2008 | Conley et al. |
| 7,447,078 B2 | 11/2008 | Li |
| 7,477,547 B2 | 1/2009 | Lin |
| 7,502,260 B2 | 3/2009 | Li |
| 7,619,922 B2 | 11/2009 | Li |
| 7,631,132 B1 * | 12/2009 | Neuman ............... 711/151 |
| 7,631,245 B2 | 12/2009 | Lasser |
| 7,984,360 B2 | 7/2011 | Sharon et al. |
| 8,059,455 B2 | 11/2011 | Stern et al. |
| 8,127,200 B2 | 2/2012 | Sharon et al. |
| 8,154,918 B2 | 4/2012 | Sharon et al. |
| 2006/0053247 A1 | 3/2006 | Cheung et al. |
| 2006/0161728 A1 | 7/2006 | Bennett et al. |
| 2006/0184723 A1 * | 8/2006 | Sinclair et al. ............ 711/103 |
| 2006/0233026 A1 | 10/2006 | Li |
| 2008/0222640 A1 * | 9/2008 | Daly et al. ............... 718/103 |
| 2009/0132754 A1 * | 5/2009 | Riska et al. ............. 711/103 |
| 2010/0023800 A1 | 1/2010 | Harari et al. |
| 2010/0070681 A1 | 3/2010 | Wan et al. |
| 2010/0100666 A1 | 4/2010 | Min |
| 2010/0169604 A1 | 7/2010 | Trika et al. |
| 2011/0040924 A1 | 2/2011 | Selinger |
| 2011/0041005 A1 | 2/2011 | Selinger |
| 2011/0041039 A1 | 2/2011 | Harari et al. |
| 2011/0055453 A1 * | 3/2011 | Bennett ................ 711/103 |
| 2011/0138100 A1 | 6/2011 | Sinclair |
| 2011/0161554 A1 | 6/2011 | Selinger et al. |
| 2011/0161784 A1 | 6/2011 | Selinger et al. |

OTHER PUBLICATIONS

"Comparing Preemptive Scheduling to Cooperative Scheduling", Jul. 31, 2010, retrieved on Feb. 2, 2010 from http://msdn.microsoft.com/en.us/library/dd998048.aspx, 5 pages.

"Open NAND Flash Interface Specification", *ONFI Open NAND Flash Interface*, Revision 2.3, Aug. 25, 2010, pp. ii-215.

Office Action for European Patent Application Serial No. 11 785 860.5 dated Feb. 19, 2014, 4 pages.

* cited by examiner

| Value | 7 | 6 | 5 | 4 | 3 | 2 | 1 | 0 |
|---|---|---|---|---|---|---|---|---|
| ONFI Status Register | WP_n | RDY | ARDY | VSP | CSP | R | FAILC | FAIL |

FIG. 4

CONTROLLER AND METHOD FOR PERFORMING BACKGROUND OPERATIONS

BACKGROUND

The Open NAND Flash Interface (ONFI) protocol provides support for parallel access to multiple NAND dies (or "logical units" (LUNs)) on a single "target" or NAND multi-chip stack on a single shared ONFI channel. For example, as shown in FIG. 8, for a target ONFI device containing 4 NAND dies (LUNs 0-3), an erase, program, or read operation can be issued by the host controller and executed on three of the LUNs while a command is still in progress on the fourth of the LUNs. This offers overlapping array access (optimal utilization) of all four dies while host controller commands are arriving. Note, however, that only one of these commands at a time may be transmitting or receiving its data on the shared channel.

In a typical mass storage application, such as a solid state drive (SSD), a central host controller will receive commands on its Serial Advanced Technology Attachment (SATA) interface and translate them to be distributed and issued to multiple ONFI target NAND multi-chip stacks. In addition to dispatching host commands to the intended memory dies, the host controller can also perform memory management/storage optimization functions, which typically include a non-trivial amount of data moves/copies among the pool of NAND dies. Whether the host controller is dispatching a host command or a memory management/storage optimization command to each LUN, the command runs to completion on that LUN without being interrupted.

SUMMARY

The present invention is defined by the claims, and nothing in this section should be taken as a limitation on those claims.

By way of introduction, the embodiments described below provide a controller and method for performing background operations. In one embodiment, a controller is provided with interfaces through which to communicate with a host and a plurality of flash memory devices. The controller contains a processor operative to perform a foreground command received from the host, wherein the processor performs the foreground command to completion without interruption. The processor is also operative to perform a background commands or operations stored in the controller's memory, wherein the processor performs the background command until completed or preempted by a foreground command. If the background command is preempted, the processor can resume performing the background command at a later time until completed.

Other embodiments are disclosed, and each of the embodiments can be used alone or together in combination. The embodiments will now be described with reference to the attached drawings.

BRIEF DESCRIPTION OF THE DRAWINGS

FIG. 4 is an illustration of an exemplary status register of an embodiment.

DETAILED DESCRIPTION OF THE PRESENTLY PREFERRED EMBODIMENTS

Introduction

The following embodiments are directed to a controller and method for performing background operations. As discussed above, although the ONFI protocol provides support for parallel access to multiple NAND LUNs to allow the multiple NAND LUNs to be utilized while waiting for host controller commands to arrive, commands that are in-progress must run to completion without being interrupted, even if the in-progress command is lower priority than the incoming command. This can occur, for example, when the in-progress command is for a Flash device management operation, while the incoming command is for reading or writing user data. Performance can be significantly degraded in such situations.

To overcome this problem and improve performance, the following embodiments provide a controller that can distinguish between commands for operations that should be performed to completion without being interrupted ("foreground commands") and commands for operations that can be preempted/interrupted by a foreground command and continued at a later time ("background commands"). In this way, unlike foreground commands which typically have a predetermined completion time, background commands can have an uncertain completion time, depending on how much they are interrupted by foreground commands. These embodiments also take advantage of the fact that the host controller will typically not consume the full parallel bandwidth to/from all the NAND LUNs. These embodiments also provide a split foreground/background protocol with mechanisms and rules to utilize "idle" time to perform background commands. In one preferred embodiment, these mechanisms are designed to be compatible with host controllers that support current ONFI standard capabilities.

Before turning to exemplary embodiments relating to the use of foreground and background commands, the following section discusses an exemplary controller architecture for use with NAND interfaces and NAND interface protocols.

Exemplary Controller Architecture and NAND Interfaces and Protocols

Figure 1:
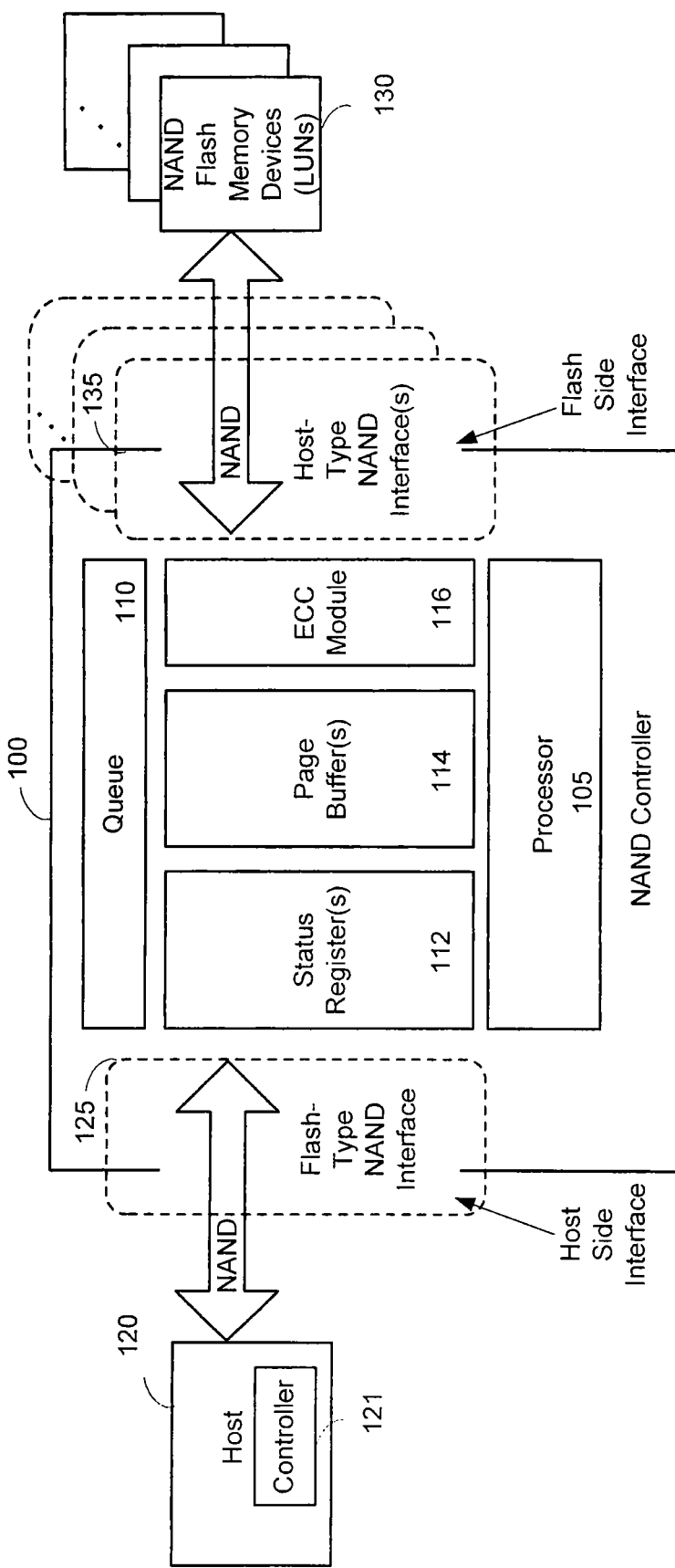
FIG. 1 is a block diagram of an exemplary controller of an embodiment.

Turning now to the drawings, FIG. 1 is a block diagram of an exemplary controller 100 of an embodiment. As shown in FIG. 1, the controller 100 is in communication with a host 120 (having a host controller 121) through a first NAND interface 125 and is in communication with one or more NAND flash memory device(s) (or "logical units" (LUNs)) 130 through one or more second NAND interface(s) 135. (The host controller in solid state drive (SSD) applications can have one or more first NAND interfaces (e.g., eight channels), in which case the controller 100 can see only one of those channels.) As used herein, the phrase "in communication with" means directly in communication with or indirectly in communication with through one or more components, which may or may not be shown or described herein. Also, while the controller 100 and flash memory device(s) 130 are shown as two separate boxes, it should be understood that the controller 100 and flash memory device(s) 130 can be arranged in any suitable manner (e.g., packaged in different packages, packaged within a common multi-chip package, and or integrated on a same die). In any of these arrangements, it is preferred that the controller be physically located separately from the host. This allows the controller and flash memory device(s) to be considered a separate circuitry unit, which can be used in a wide variety of hosts.

A "host" is any entity that is capable of accessing the one or more flash memory device(s) 130 through the controller 100, either directly or indirectly through one or more components named or unnamed herein. A host can take any suitable form, such as, but not limited to, a personal computer, a mobile phone, a game device, a personal digital assistant (PDA), an email/text messaging device, a digital camera, a digital media (e.g., MP3) player, a GPS navigation device, a personal navigation system (PND), a mobile Internet device (MID), and a TV system. Depending on the application, the host 120 can take the form of a hardware device, a software application, or a combination of hardware and software.

"Flash memory device(s)" refer to device(s) containing a plurality of flash memory cells and any necessary control circuitry for storing data within the flash memory cells. In one embodiment, the flash memory cells are NAND memory cells, although other memory technologies, such as passive element arrays, including one-time programmable memory elements and/or rewritable memory elements, can be used. (It should be noted that, in these embodiments, a non-NAND-type flash memory device can still use a NAND interface and/or NAND commands and protocols.) One example of a passive element array is a three-dimensional memory array. As used herein, a three-dimensional memory array refers to a memory array comprising a plurality of layers of memory cells stacked vertically above one another above a single silicon substrate. In this way, a three-dimensional memory array is a monolithic integrated circuit structure, rather than a plurality of integrated circuit devices packaged or die-bonded in close proximity to one another. Although a three-dimensional memory array is preferred, the memory array can instead take the form of a two-dimensional (planar) array. The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 6,034,882; 6,185,122; 6,420,215; 6,631,085; and 7,081,377. Also, the flash memory device(s) 130 can be a single memory die or multiple memory dies. Accordingly, the phrase "a flash memory device" used in the claims can refer to only one flash memory device or more than one flash memory device.

As shown in FIG. 1, the controller 100 also comprises a processor 105, a queue 110, one or more status register(s) 112, one or more page buffers 114, and an error correction code (ECC) module 116. (The controller 100 can contain other components, which are not shown in FIG. 1 to simplify the drawing.) As used herein, a "module" can include hardware, software, firmware, or any combination thereof. Examples of forms that a "module" can take include, but are not limited to, one or more of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. While only one module (the ECC module 116) is shown in FIG. 1, it should be understood that one or more additional modules for providing other functionality can be used. Examples of these additional modules include, but are not limited to, data scrambling, column replacement, handling write aborts and/or program failures (via safe zones), read scrubbing, wear leveling, bad block and/or spare block management, error detection code (EDC) functionality, status functionality, encryption functionality, error recovery, and address mapping (e.g., mapping of logical to physical blocks). Further information about these various functions is described in U.S. patent application Ser. Nos. 12/539,394; 12/539,407; 12/539,379; 12/650,263; 12/650,255; and 12/539,417, which are hereby incorporated by reference.

As noted above, the controller 100 communicates with the host 120 using a first NAND interface 125 and communicates with the flash memory device(s) 130 using second NAND interface(s) 135, which operate under NAND interface protocols. Examples of NAND interfaces include, but are not limited to, Open NAND Flash Interface (ONFI), toggle mode (TM), and a high-performance flash memory interface, such as the one described in U.S. Pat. No. 7,366,029, which is hereby incorporated by reference. The controller 100 may optionally include one or more additional host-side interfaces, for interfacing the controller 100 to hosts using non-NAND interfaces, such as SD, USB, SATA, or MMC interfaces. Also, the interfaces 125, 135 can use the same or different NAND interface protocols.

In general, a NAND interface protocol is used to coordinate commands and data transfers between a NAND flash device and a host using, for example, data lines and control signals, such as ALE (Address Latch Enable), CLE (Command Latch Enable), and WE# (Write Enable). Even though the term "NAND interface protocol" has not, to date, been formally standardized by a standardization body, the manufacturers of NAND flash devices all follow very similar protocols for supporting the basic subset of NAND flash functionality. This is done so that customers using NAND devices within their electronic products could use NAND devices from any manufacturer without having to tailor their hardware or software for operating with the devices of a specific vendor. It is noted that even NAND vendors that provide extra functionality beyond this basic subset of functionality ensure that the basic functionality is provided in order to provide compatibility with the protocol used by the other vendors, at least to some extent.

A given device (e.g., a controller, a flash memory device, a host, etc.) is said to comprise, include, or have a "NAND interface" if the given device includes elements (e.g., hardware, software, firmware, or any combination thereof) necessary for supporting the NAND interface protocol (e.g., for interacting with another device using a NAND interface protocol). (As used herein, the term "interface(s)" can refer to a single interface or multiple interfaces. Accordingly, the term "interface" in the claims can refer to only one interface or more than one interface.) In this application, the term "NAND Interface protocol" (or "NAND interface" in short) refers to an interface protocol between an initiating device and a responding device that, in general, follows the protocol between a host and a NAND flash device for the basic read, write, and erase operations, even if it is not fully compatible with all timing parameters, not fully compatible with respect to other commands supported by NAND devices, or contains additional commands not supported by NAND devices. One suitable example of a NAND interface protocol is an interface protocol that uses sequences of transferred bytes equivalent in functionality to the sequences of bytes used when interfacing with a Toshiba TC58NVG1S3B NAND device (or a Toshiba TC58NVG2D4B NAND device) for reading (opcode 00H), writing (opcode 80H), and erasing (opcode 60H), and also uses control signals equivalent in functionality to the CLE, ALE, CE, WE, and RE signals of the above NAND device.

It is noted that a NAND interface protocol is not symmetric in that the host—not the flash device—initiates the interaction over a NAND interface. Further, an interface (e.g., a NAND interface or an interface associated with another protocol) of a given device (e.g., a controller) may be a "host-side interface" (e.g., the given device is adapted to interact with a host using the host-side interface), or the interface of the given device may be a "flash memory device-side interface" (e.g., the given device is adapted to interact with a flash memory device using the flash memory device-side interface). The terms "flash memory device-side interface," "flash device-side interface," and "flash-side interface" are used interchangeably herein.

These terms (i.e., "host-side interface" and "flash device-side interface") should not be confused with the terms "host-type interface" and "flash-type interface," which are terminology used herein to differentiate between the two sides of a NAND interface protocol, as this protocol is not symmetric. Furthermore, because it is the host that initiates the interaction, we note that a given device is said to have a "host-type interface" if the device includes the necessary hardware and/or software for implementing the host side of the NAND interface protocol (i.e., for presenting a NAND host and initiating the NAND protocol interaction). Similarly, because the flash device does not initiate the interaction, we note that a given device is said to have a "flash-type interface" if the device includes the necessary hardware and/or software for implementing the flash side of the NAND protocol (i.e., for presenting a NAND flash device).

Typically, "host-type interfaces" (i.e., those which play the role of the host) are "flash device-side interfaces" (i.e., they interact with flash devices or with hardware emulating a flash device) while "flash device-type interfaces" (i.e., those which play the role of the flash device) are typically "host-side interfaces" (i.e., they interact with hosts or with hardware emulating a host).

Additionally information about exemplary controllers (and their advantages over prior controllers) can be found in U.S. Pat. No. 7,631,245 and U.S. patent application Ser. Nos. 12/539,394; 12/539,407; 12/539,379; 12/650,263; 12/650,255; and 12/539,417, which are hereby incorporated by reference.

Figure 2:
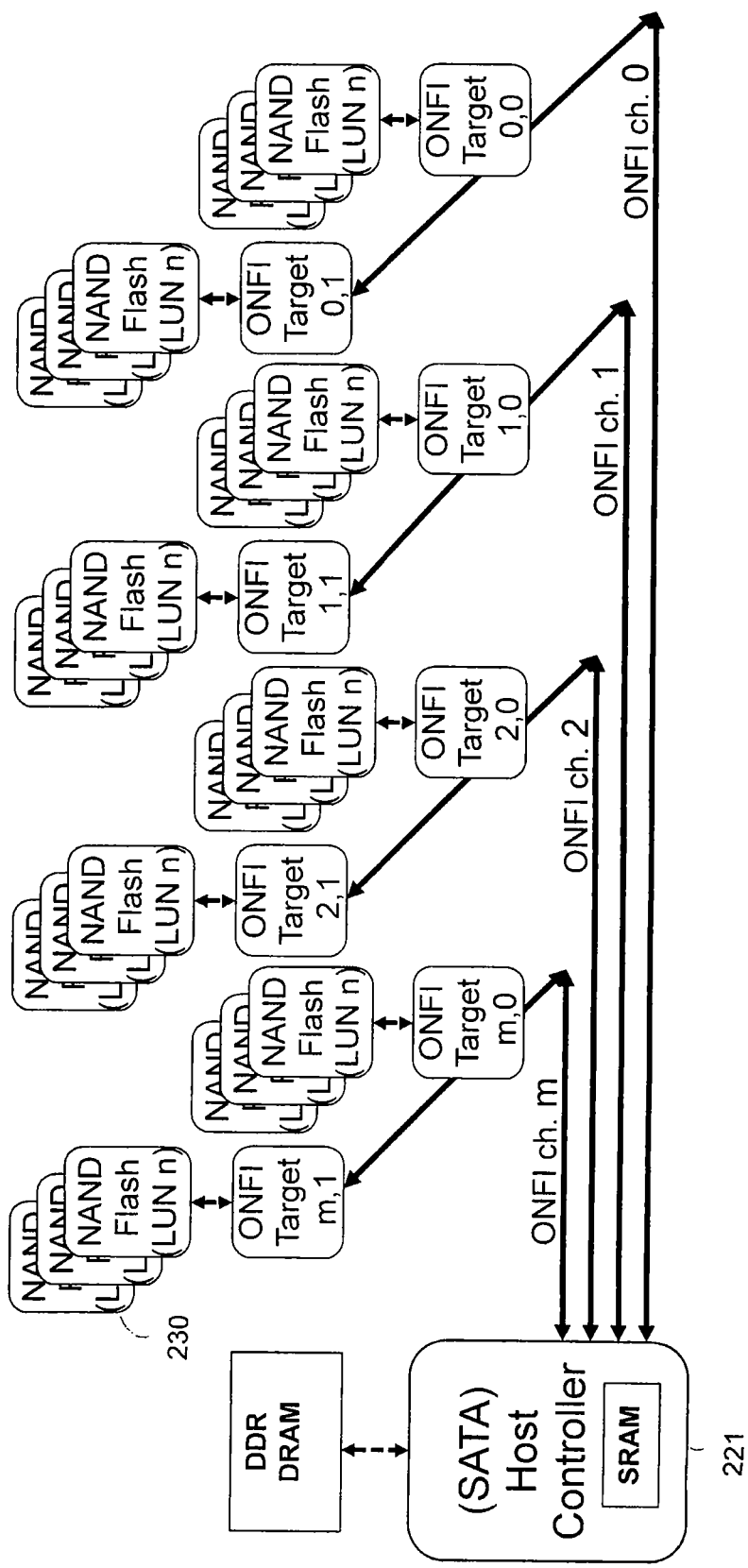
FIG. 2 is a block diagram of a solid state drive of an embodiment.

Lastly, it should be noted that the controller 100 and flash memory device(s) 130 can be used in any desired system environment. For example, in one implementation, a product manufactured with one or more controller 100/flash memory device(s) 130 units is used in a solid-state drive (SSD). An example of a SATA-based SSD application is shown in FIG. 2, where a central host controller 221 accesses (on each ONFI channel and across several ONFI channels) multiple attached ONFI targets, where each ONFI target contains a controller similar to the controller 100 in FIG. 1 and is connected to a plurality of NAND flash devices 230. As another example, the controller 100 can be used in OEM designs that use a Southbridge controller to interface to flash memory devices.

Embodiments Relating to Foreground and Background Commands

As mentioned above, although the ONFI protocol provides support for parallel access to multiple NAND LUNs to allow the multiple NAND LUNs to be utilized while waiting for host controller commands to arrive, commands that are in-progress must run to completion without being interrupted, even if the in-progress command is lower priority than the incoming command. This can occur, for example, when the in-progress command is for performing a Flash device management operation, while the incoming command is for reading or writing user data. Performance can be significantly degraded in such situations.

To overcome this problem and improve performance, the controller 100 in FIG. 1 is operative to distinguish between foreground commands and background commands and execute each according to a priority system. As used herein, a "foreground command" refers to a command for an operation that is preferably performed to completion without being interrupted and typically has a predetermined completion time. A foreground command is typically issued by the host controller 121 and sent to the NAND controller 100 for execution. Examples of a foreground command include, but are not limited to, a read command, a write command, an erase command, and a "legacy copyback command.

In contrast, a "background command" refers to a command for an operation that can be preempted/interrupted by a foreground command and continued at a later time. Unlike foreground commands which typically have a predetermined completion time, background commands can have an uncertain completion time, depending on how much they are interrupted by foreground commands. A background command can be performed whenever possible when no host foreground commands are currently being executed. A background command can either be issued by the host controller 121 and sent to the controller 100 for execution or can be generated by the NAND controller 100 itself. Examples of a background command include, but are not limited to, data scrambling, column replacement, handling write aborts and/or program failures (via safe zones), read scrubbing, wear leveling, bad block and/or spare block management, error detection code (EDC) functionality, status functionality, encryption functionality, error recovery, and address mapping (e.g., mapping of logical to physical blocks). The following paragraphs describe some of these commands in more detail.

"Data scrambling" or "scrambling" is an invertible transformation of an input bit sequence to an output bit sequence, such that each bit of the output bit sequence is a function of several bits of the input bit sequence and of an auxiliary bit sequence. The data stored in a flash memory device may be scrambled in order to reduce data pattern-dependent sensitivities, disturbance effects, or errors by creating more randomized data patterns. More information about data scrambling can be found in the following patent documents: U.S. patent application Ser. Nos. 11/808,906, 12/209,697, 12/251,820, 12/165,141, and 11/876,789, as well as PCT application no. PCT/US08/88625.

"Column replacement" refers to various implementations of mapping or replacing entirely bad columns, portions of columns, or even individual cells. Suitable types of column replacement techniques can be found in U.S. Pat. Nos. 7,379,330 and 7,447,066.

There are several potential problems in writing to flash memory devices where logically or physically adjacent data may be corrupted outside of the location where the data is attempted to be written. One example is when a write to one area (e.g., a cell, page, or block) of memory fails, and the contents of some surrounding memory may be corrupted. This is referred to as a "program failure" or "program disturb." A similar effect known as "write abort" is when a write (or program) operation is terminated prematurely, for example when power is removed unexpectedly. In both cases, there are algorithms which may be used to pro-actively copy data from a "risk zone" to a "safe zone" to handle write aborts and program failures, as described in U.S. Pat. No. 6,988,175.

"Read scrubbing" or, more generally, "scrubbing" refers to the techniques of refreshing and correcting data stored in a flash memory device to compensate for disturbs. A scrub operation entails reading data in areas that may have received exposure to potentially disturbing signals and performing some corrective action if this data is determined to have been disturbed. Read scrubbing is further described in U.S. Pat. Nos. 7,012,835, 7,224,607, and 7,477,547.

Flash memory devices may be written unevenly, and "wear leveling" refers to techniques that attempt to even out the number of times memory cells are written over their lifetime. Exemplary wear leveling techniques are described in U.S. Pat. Nos. 6,230,233 and 6,594,183.

In general, flash memory devices are manufactured with an excess number of blocks (greater than the defined minimum capacity). Either during factory testing or during use of the device, certain blocks may be discovered as "bad" or "defective," meaning that they are unable to correctly store data and need to be replaced. Similarly, there may be an excess of "good" blocks (greater than the defined minimum capacity) which may be used as "spares" until another block fails or becomes defective. Keeping track of these extra blocks is known as bad block management and spare block management, respectively. More information about bad block and spare block management can be found in U.S. Pat. No. 7,171,536.

An additional background command that can be advantageously used for background processing in the ONFI protocol relates to a form of a copy command. Copy-type operations are frequently needed in mass storage applications, such as memory cards or SSDs. The standard ONFI protocol (up to v2.2) supports various copy options. The two main approaches are (1) the host simply performs a read of the source page into the host controller's buffer memory then issues a program command of that buffer to the destination page and (2) the host issues a copyback read into the raw NAND's page register (on the NAND die) and then issues a copyback program command, telling the raw NAND to transfer that same page from the NAND's page register into a new destination page on the same raw NAND die.

ONFI v2.3 (released in August 2010) adds "EZ NAND" features, which provide for an intermediate controller ASIC to be added between the host controller and a set of (n) raw NAND die (LUNs). (Controller 100 in FIG. 1 is an example of an "EZ NAND controller" that supports or is partially or fully compliant with the commands and/or functionality of ONFI Release v2.3 or later.) This expands upon the above two options to support a "corrected copyback" capability, where a copyback page is read into the EZ NAND controller's page buffer, where it may be copyback programmed (with corrected ECC) to any destination LUN/plane/page (on any raw NAND die attached to that EZ NAND controller). This provides a third option in addition to the two listed above: (3) the host issues a copyback read into the NAND controller's page buffer 114 (FIG. 1) then issues a copyback program command telling the NAND Controller 100 to transfer that same page from the NAND controller's page buffer 114 into a new destination page on any attached raw NAND dies 130. (ECC is checked and corrected by the ECC module 116 before transferring back to the raw NAND dies 130).

While the above copy options provide the basics for immediate data movement, the existing ONFI protocol does not support extended copy operations that could provide more sophisticated and powerful data movement capability. In particular, ONFI has the following limitations: (a) only a single page is copied per host command (not counting multi-plane copies), (b) the host controller must issue and control each step (e.g., read, then program) of an iterative copy operation, (c) the host must wait for completion of that command before issuing another command to the same LUN, and (d) ONFI does not support concurrent operations (e.g., longer interruptible copy in the background that may be pre-empted by short read(s) in the foreground, with the background copy later resumed).

Another type of copy operation that can be used is the CopyList command, which provides a flexible, parameterized list of source pages and destination pages/blocks. Two types of CopyList commands can be used: CopyPage and CopyBlock. With the CopyPage command, N pages are copied from source page(s) to destination page(s). The CopyPage command can be issued in the foreground for an immediate response, in which case the foreground LUN stays busy until the read and program phases are complete, so that new arriving host commands cannot interrupt this command. With the CopyBlock command, N pages are copied in the background from source page(s) to a destination block. The CopyBlock command is preferably issued as a background command, in which case the background LUN or LUNs go busy only until a CopyList command is accepted, and new arriving host foreground commands can cause a "pause" of the CopyBlock command. Since the CopyBlock command may not be completed, a ReadMetaData command can be issued to poll for the completion of portions of the CopyBlock command. (Additional information relating to these commands is discussed at the end of this document.)

With the foreground/background features discussed above, these embodiments can provide a background copy capability that addresses the noted limitations of ONFI. Specifically, the NAND controller 100 can be used to implement a multi-page interruptible copy command that can be run at reduced priority in the background. The NAND controller 100 can manage background operations such that foreground commands may be issued at any time and may be unaware of and unconstrained by background commands in process.

Figure 3:
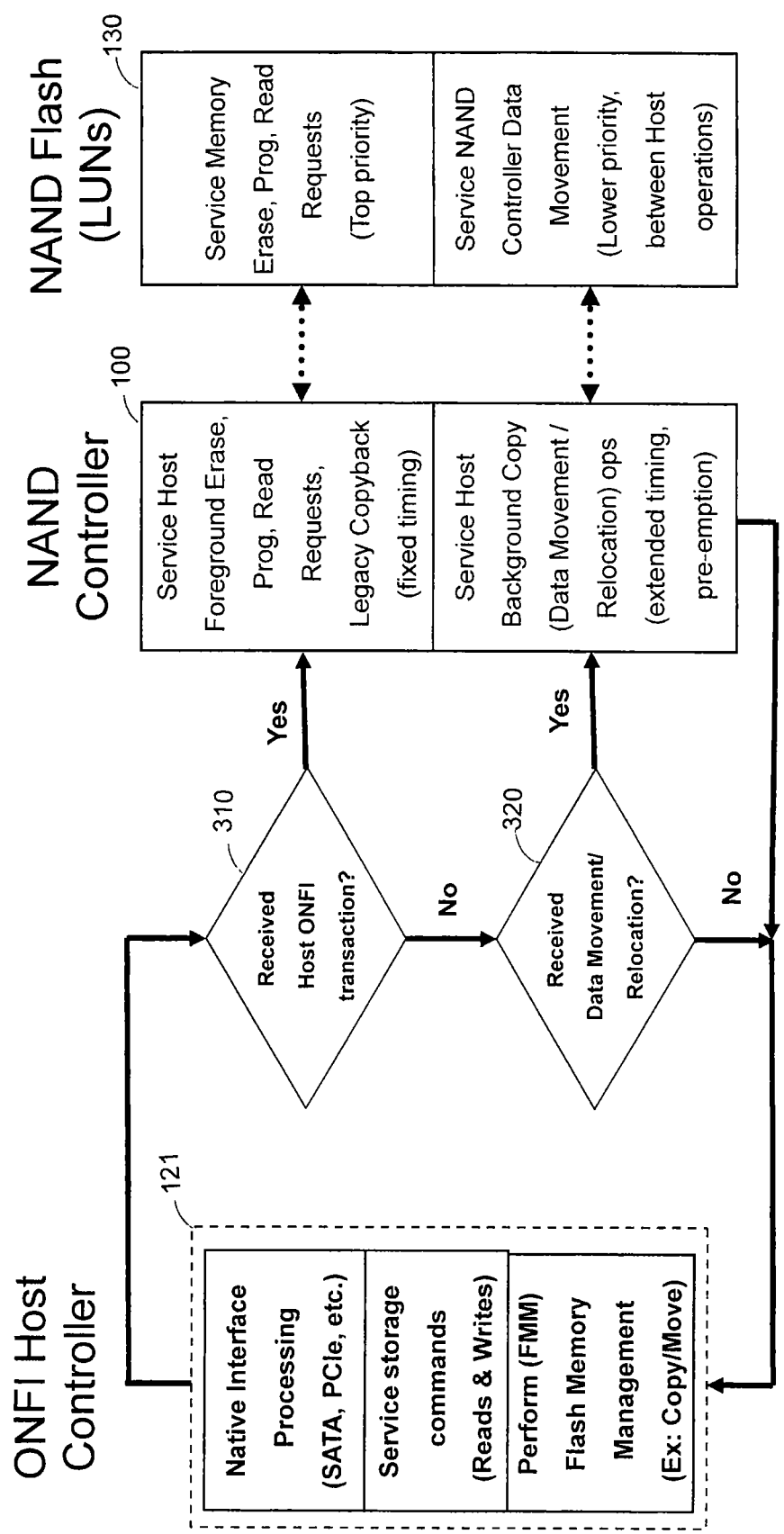
FIG. 3 is a block diagram of an embodiment illustrating the general concept of distinguishing between foreground and background commands.

Returning to the drawings, FIG. 3 is a block diagram of an embodiment illustrating the general concept of distinguishing between foreground and background commands. As shown in FIG. 3, the host controller 121 is capable of native interface processing (such as SATA and PCIe) and can issue both foreground commands (e.g., service storage commands, such as reads and writes) and background commands (e.g., Flash memory management commands, such as copy and move). (It should be noted that while the host controller 121 is capable of issuing both foreground and background commands in this example, as mentioned above, the NAND controller 100 itself can also generate a background command.)

When the NAND controller 100 receives a command from the host controller 121, it determines if the command is a foreground command that should be executed as soon as possible (even if that means interrupting a background command that is in progress) or if the command is a background command that can be stored for later execution (or executed immediately if no higher priority commands are waiting or are in progress). For example, as shown in FIG. 3, if the command is for a host ONFI transaction with fixed timing (e.g., an erase command, a program command, a read command, a legacy copyback command), the NAND controller 100 treats the command as a foreground command, giving the command top priority and servicing it as soon as possible. On the other hand, if the command is for a data movement/relocation command that can be preempted because it does not have fixed timing (e.g., a background copy command), the NAND controller 100 treats the command as a background command, giving the command lower priority and servicing it, in whole or in part, over time between foreground commands. The controller 100 can determine whether a command is a foreground command or a background command based on some distinguishing feature in the command itself, or other mechanisms can be used, as will be discussed below.

Returning to FIG. 1, the various components shown in the controller 100 can be used to implement the method discussed above. For example, the queue (memory) 100 can be used to store background commands until they are ready to be executed (as will be discussed below, background commands in the queue 100 can be executed in any order, not necessarily in an order in which the background commands are stored in the queue 100. Also, the status registers(s) 112 are used to indicate which of the LUNs 130 are being operated upon by a foreground or background command, and the page (data) buffer(s) 114 are used to store data that is being read or written to the LUNs 130 as part of a foreground or background command. (The status register(s) 112 and/or the page buffer(s) 114 can be shared for use with both foreground and background commands, or separate status and/or page buffers can be used with foreground and background commands.) The ECC module 116 is preferably used with data transfers for both foreground and background commands.

With the foregoing general discussion of performing background operations in mind, the following paragraphs provide additional implementation details. It should be noted that these details are not intended to limit the scope of the claims and, therefore, should not be read into the claims unless explicitly recited therein. In general, the following paragraphs relate to the following topics:

I. Distinguishing foreground and background commands sent over single-level ONFI bus protocol;
 II. Independent busy indicators for foreground and background commands;
 III. Independent command/operation status indicators (e.g., success/fail) for foreground and background commands;
 IV. Rules/mechanisms for arbitrating foreground/background commands to the same LUN;
 V. Coherency rules/mechanisms for simultaneous foreground/background commands to the same LUN;
 VI. Specification of response time for foreground/background commands; and
 VII. Data Buffer management/sharing for foreground/background commands.

I. Distinguishing Foreground and Background Commands Sent Over Single-Level ONFI Bus Protocol There are several ways to implement a foreground/background command indication from the host to the ONFI target in a transparent way to preserve ONFI 2.2/2.3 protocol compatibility. The following are some exemplary implementations of a foreground/background command protocol over an ONFI bus with an 8 LUN die package:

1. The host controller can issue only foreground commands to LUNs 0-7 on CE0 (Chip Enable/Select 0) and issue only background commands to the same LUNs 0-7 on CE1. Host controllers see these as completely independent LUNs and thus impose no issue, ordering, or busy restrictions on them. The controller 100 knows it references the same 0-7 LUNs, and it manages interleaving/pre-emption of background commands.

2. The host controller and ONFI Target agree on a vendor-specific (VSP) bit/flag to specify whether a command is a foreground or background command in an address phase of the issued command. The target directs foreground/background=0 commands to (normal ONFI) foreground LUN processing, while the target directs foreground/background=1 commands to background LUN processing. (The host controller may be subject to issuing or ordering dependencies on LUNs 0-7.)

3. If only a small sub-set of commands is supported in background mode (such as copy), then separate vendor specific ("VSP") commands can be defined to distinguish foreground commands (e.g., CopyPage commands) from background commands (e.g., CopyBlock commands). Implicitly, a CopyPage command would be executed immediately in the foreground, while a CopyBlock command would be accepted for background processing with no immediate or pre-determined completion time.

II. Independent Busy Indicators for Foreground and Background Commands

The following are several exemplary ways to implement a foreground/background command busy indication from the ONFI target back to the host controller in a transparent way to preserve ONFI 2.2/2.3 protocol compatibility:

1. Along with the two sets of foreground and background LUNs, the NAND controller 100 can implement two sets of status registers 112 (one for foreground commands and the other for background commands), each containing an independent LUN Busy bit. Foreground and background status registers 112 each have a capacity of one command, and the controller 100 manages the bits to reflect when the foreground or background commands are in progress or have been completed, indicating if another command may be submitted for execution. The host controller 121 can check the foreground or background busy status by issuing a read status command to the appropriate LUN.

FIG. 4 is an illustration of an exemplary status register of an embodiment in which there are 8 LUNs and one register location per LUN. The following is a brief description of each of the various status values:

FAIL—If set to one, then the last command failed. If cleared to zero, then the last command was successful. In one embodiment, this bit is valid for read, program, and erase operations.

FAILC—This bit is used with cached commands, which, in some embodiments, is not supported.

CSP (Command Specific)—This bit has command-specific meaning. In some embodiments, for read operations, if the CSP bit is set to one then the last read operation exceeded the ECC threshold, and the host controller should take appropriate action (e.g., re-write the data to a new location). When FAIL is set to one, the CSP bit is "don't care." For other operations, this bit is reserved.

ARDY—This bit is used with cached commands, which, in some embodiments, is not supported.

RDY—If set to one, then the LUN or plane address is ready for another command and all other bits in the status value are valid. If cleared to zero, then the last command issued is not yet complete and status register bits 5:0 are invalid and should be ignored by the host. When caching operations are in use, this bit indicates whether another command can be accepted, and ARDY indicates whether the last operation is complete.

R—Reserved.

VSP—Vendor specific.

WP_n—Write protected

2. Foreground Busy can work as in standard ONFI, and background-intended commands (indicated by a foreground/background flag bit) could be essentially "swallowed" (i.e., no LUN Busy is indicated)—they could be processed asynchronously in the background until completed. The host controller 121 can query for completion of background commands by issuing a follow-up read status—type command (such as a VSP "ReadMetadata" command), where the NAND controller 100 can indicate progress or completion of the background command with a flag or counter within the data payload. For foreground commands, the standard Read Status command can be issued to the appropriate LUN.

3. The NAND controller 100 can support "queuing" of foreground and/or background commands, up to some indicated queue-depth. In this case, the foreground or background LUN busy bits would either never go busy, or the busy bits would indicate that the capacity of the queue 110 had been reached. In this arrangement, the host controller 121 would preferably be required to never exceed the queue submission limit, and/or an extension method of indicating queue fullness or reference to which individual command in the queue was currently executing (queue head) could be provided.

III. Independent Command/Operation Status Indicators (e.g., Success/Fail) for Foreground and Background Commands;

The following are several exemplary ways to implement a foreground/background command success/fail indication from the ONFI target back to the host controller 121 in a transparent way to preserve ONFI 2.2/2.3 protocol compatibility:

1. With the two sets of status registers 112 mentioned in the section above (one for foreground commands and the other for background commands), each status register could reflect the status of its most-recently-completed operation. The host controller 121 can check foreground or background fail status by issuing the Read Status command to the appropriate LUN.

2. The NAND controller 100, in conjunction with the host controller 121, can provide an extended status mechanism, which could provide more detailed status reporting for both foreground and background operations and could provide for convenient handling of the asynchronous nature of the status for background operations.

3. The NAND controller 100 can internally maintain completion status of both foreground and background commands and can provide the requested command (foreground or background) in the same status register bit location upon receiving a Read Status command and a specification of a foreground or background command.

IV. Rules/Mechanisms for Arbitrating Foreground/Background Commands to the Same LUN Given the two sets of independent foreground and background LUNs and status registers 112 as mentioned above, the NAND controller 100 can internally manage the interleaving of foreground and background commands on the same LUN (the host controller 121 may need to abide by some concurrent access rules between foreground and background addresses). In general, foreground commands would temporarily pre-empt background operations in progress. If there is no address overlap, then foreground and background commands would have no conflict.

V. Coherency Rules/Mechanisms for Simultaneous Foreground/Background Commands to the Same LUN With the added capability for two independent, but concurrent, streams of access (foreground and background commands) to a single LUN/NAND die, the controller 100 preferably abides by a set of coherency rules to prevent data hazards or data corruption caused by erroneous ordering of erases, programs, and reads between the two streams when participating in interleaved operation within the same memory range. The following are exemplary ways of managing command coherency when there is simultaneous access by the foreground and background entities:

1. A simple "brute force" approach can be used in which foreground commands can be held up (by setting "busy" in the status registers of the source and destination LUNs of a background operation) until the background operation is complete. For example, if the status register indicates that two LUNs are busy (because of a LUN-to-LUN background copy/move operation), the status register can continue to be marked as busy for the full duration of the read and program operations.

2. The host controller 121 can prevent simultaneous issuance of foreground and background commands that would represent a potential memory coherency conflict.

Figure 5:
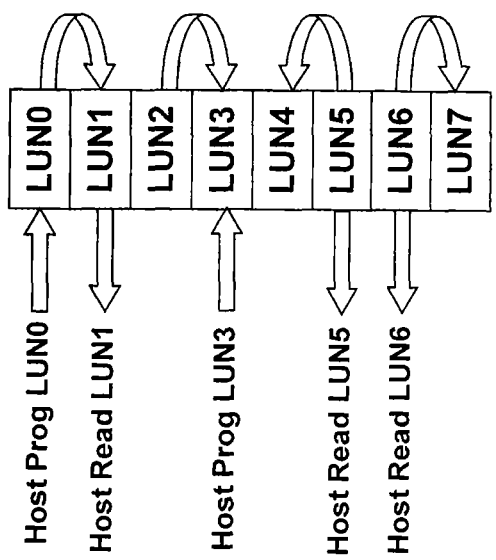
FIG. 5 is an illustration of the use of coherency rules in a controller of an embodiment.

3. The NAND controller 100 can use internal coherency rules. FIG. 5 will be used to illustrate the use of internal coherency rules with an example of concurrent host access during LUN-to-LUN background copies. In this embodiment, if the host command's target block (e.g., a block address to be read or written) is not the same as the active background CopyBlock, then the host command can proceed without restriction.

Also, subsequent host reads of the active background Copy source LUN (read from the NAND page register) can proceed if new a buffer is available. Subsequent host writes to the active background Copy source LUN are held-off until the source buffer becomes the destination buffer (if the new source buffer is available); otherwise, until the NAND program phase of copy is done.

Subsequent host reads of the active background copy destination LUN (program to NAND page register) are held off until new data (from the source) was written to the destination LUN buffer during NAND program time. Subsequent host writes are held-off until the destination buffer NAND program is done (until the copy is done). Several restrictions can be employed. For example, in one embodiment, it is preferred that LUN to LUN copies are not treated as a target command (i.e., all LUNs would become "busy"). Also, it may be preferred that a (SA, DA) copy operation not cross LUN or block boundaries. It may also be preferred to restrict overwrites of the source LUN and reads from the destination LUN buffer until the destination LUN program is deemed a "success."

Figure 6:
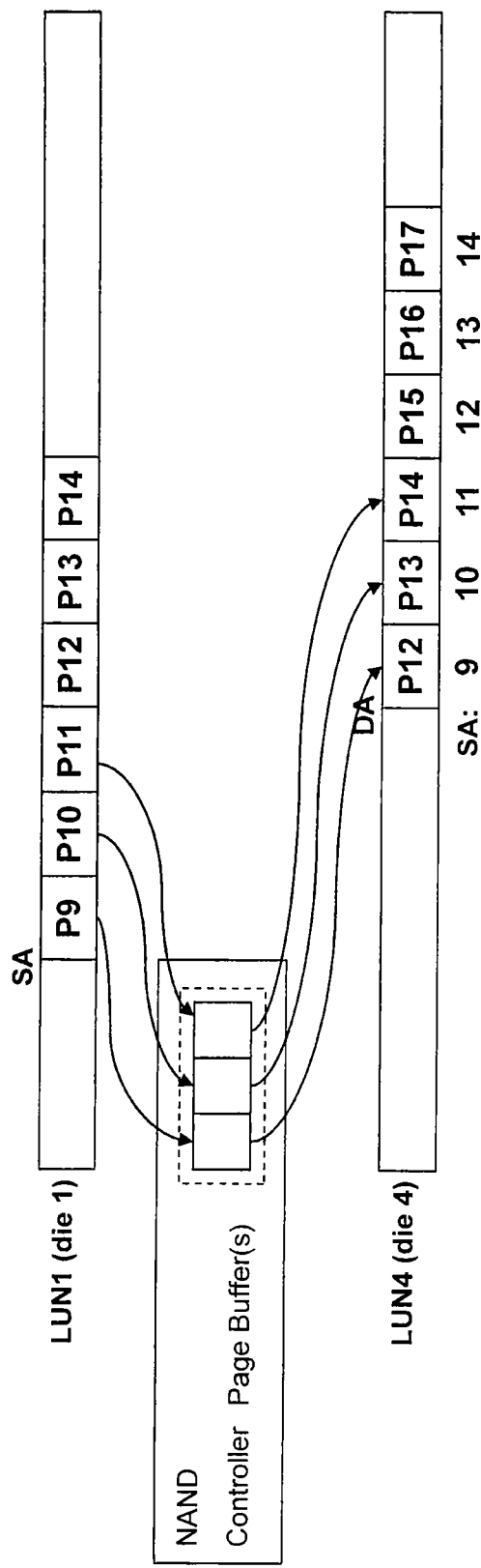
FIG. 6 is an additional illustration of coherency rules during an example copy operation in an embodiment for a LUN-to-LUN copy.

As another example, FIG. 6 illustrates coherency rules for host access during a LUN-to-LUN background Copy operation, with a background Copy from source LUN1 (P9-P14) to destination LUN4 (P12-P17). As illustrated in this figure, for a host read SA+3 (LUN1-P12), the source LUN is not modified by the copy, so reads are allowed anytime. For a host write SA+3 (LUN1-P12), it is ok to overwrite after the source LUN data has been transferred to the destination address (LUN4-P15). For a host read DA+3 (LUN4-P15), the command is held until a new data value (from LUN1-P12) has been transferred to destination address (LUN4-P15). A host write DA+3 (LUN4-P15) is essentially the next program command, which is not allowed. In NAND technology, write-after-write (WAW) is undefined. It is expected that a block erase occurs first—before the next write).

VI. Specification of Response Time for Foreground/Background Commands

There are several options on how this may be handled. One simple approach is detailed here. While background commands generally have open timing (until they are done), the timing of foreground commands will be impacted some of the time when a background command is ongoing, and there is latency to interrupt it at a logical or physical boundary in order to switch to the foreground command. To address this, two sets of timing parameters can be used. One timing parameter is for nominal/typical worst case erases, programs, and reads, which are delivered most of the time (~>90%). The other timing parameter is for the exception—long worst case erases, programs, and reads, when the LUN is busy or for exception/retry/recovery type operations that cause added response delay. The following chart provides illustrates these various parameters:

| Parameter | Typical Maximum | Exception Maximum |
|---|---|---|
| tEXBERS | tBERS | tBERS + x msec |
| tEXPROG | tPROG | tPROG + y msec |
| tEXR | tR | tR + z usec |

If just the longer exception maximum timing were reported in the ONFI parameter page, it is expected that the host controller would set its polling interval for this "worst case," which would result in unnecessary reduction in performance for the >90% of the time that the host controller would beat this timing by a large amount.

VII. Data Buffer Management/Sharing for Foreground/Background Commands

Figure 7:
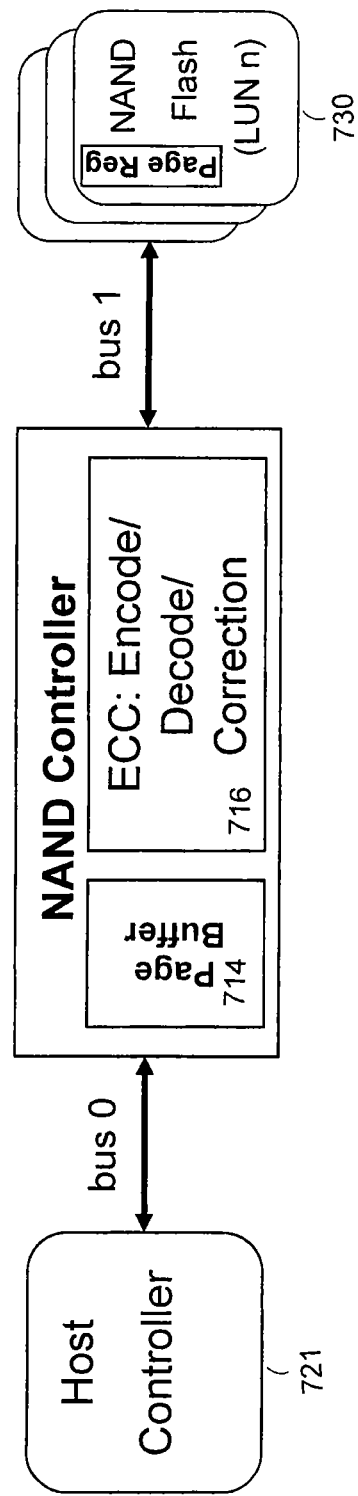
FIG. 7 is a block diagram of an exemplary controller of an embodiment.
Figure 8:
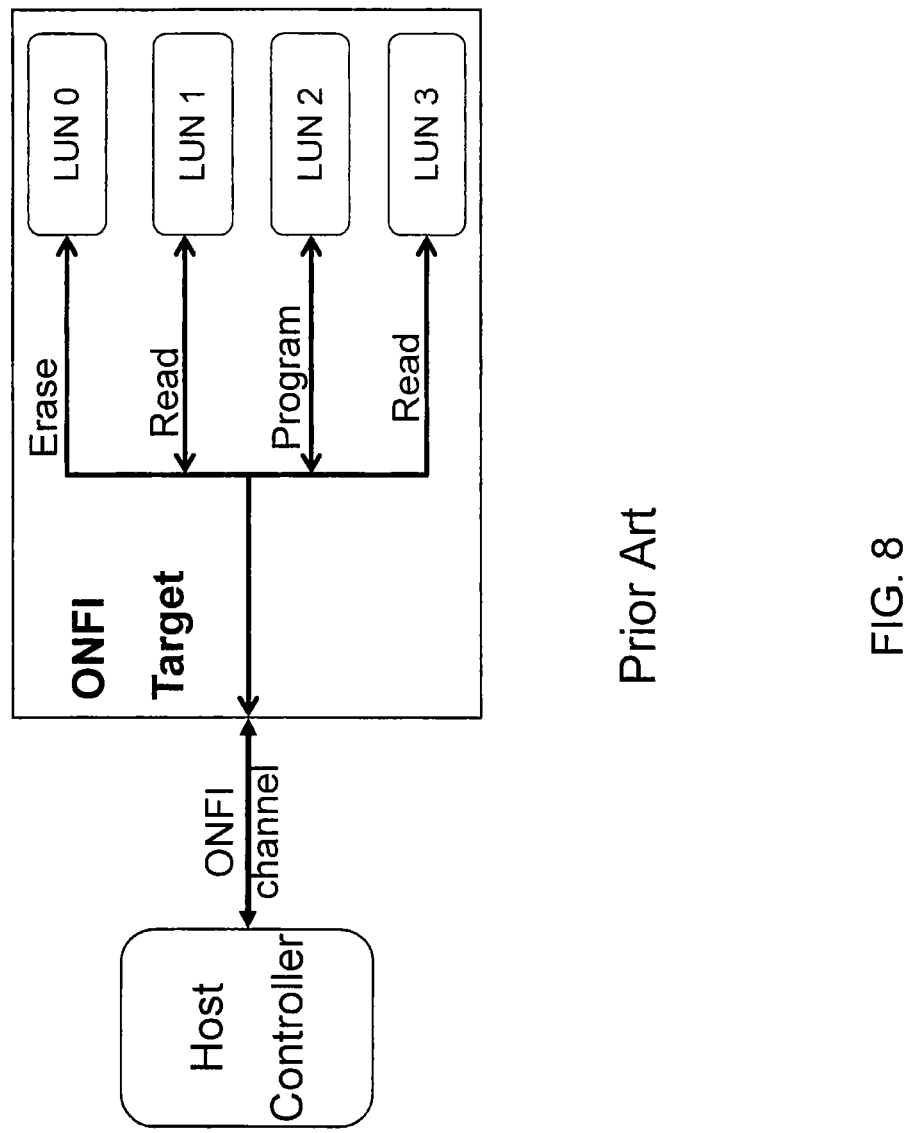
FIG. 8 is a block diagram of a prior art host controller and ONFI target.

In a NAND controller, such as the one shown in FIG. 7, that contains an ECC module 716 for performing ECC functionality and that dispatches program and read operations to multiple LUNs/NAND dies, data is preferably buffered in the page buffer 714 between the host interface (bus0: ONFI) and the Flash interface (bus1: ONFI, HSI, TM, etc.). While this could technically be done with a fairly small FIFO, it is preferred that this be implemented with at least one buffer that is at least the size of a NAND page register (e.g., 8 KB/16 KB). This page buffer 714 can be used to store data being written to or read from the NAND Flash LUNs. In the case of a page copy operation, for example, it is efficient to use the same buffer from the read phase to the program phase. Further, since ONFI supports simultaneous operations over multiple LUNs, it is beneficial to provision one page buffer per LUN, which facilitates interleaved LUN operations. Also, using only a single page buffer (shared among all LUNs) of the smallest size would minimize cost of the controller (die size), but at the expense of increased complexity of firmware (e.g., managing sharing the single buffer among LUNs), and possibly reduced performance.

It should be noted that utilizing multiple page buffers per LUN/die (through hardware or firmware) would enable overlapped bus0 transfers (from the host) to a second buffer in the controller for LUN n, while a bus1 transfer from a first buffer in the controller (to Flash) is still proceeding for that same LUN n.

Given that at least one page buffer for each active LUN/die is provided and that this page buffer is busy for the duration of the read or program operation, we can consider how these buffers might be used and shared. In general, data buffer sharing can be considered across two dimensions: (1) data buffer sharing among multiple LUNs (NAND dies) on an ONFI Target (controller+N number of LUNs) and (2) data buffer sharing among foreground and background operations to the same LUN, which is relevant to these embodiments.

The following paragraphs will now discuss the use of copy and copyback operations and their implications on foreground and background operations. Baseline ONFI nominal read and program operations occupy the page buffer until those operations are completed, then their contents is no longer needed. Copy operations (such as copyback in legacy ONFI), on the other hand, need data from the first operation (read) to remain available afterwards for the second operation (program). With the use of ECC in the controller, there may be a need for a buffer transfer or a "hand-off" indicator.

As discussed above, a foreground CopyPage command is a copyback read command plus a copyback program command to same or different LUNs/dies. With this command, the controller reads and then copies/writes a single page. During this process, the source LUN goes "busy" during the copyback read command, and the destination LUN goes "busy" during the copyback program command. This command uses a single page buffer. The page buffer begins first as the source LUN buffer for read and then becomes the destination LUN buffer for program.

If the destination LUN does not equal the source LUN, a new destination LUN buffer would preferably be specified for the copyback program phase by one of the following three methods: (1) imply the previous copyback read LUN buffer becomes the current copyback program LUN (i.e., command adjacency), but this precludes a LUN interleave of copyback commands, (2) define a bit-field in the copyback program command to specify which page/LUN buffer is the data source, or (c) add a VBX (Virtual Buffer eXchange) command (e.g., exchange source LUN 3 to destination LUN 4).—Ex: Exchange Src. LUN 3 to Dest. LUN 4.

For foreground/background multi-page copies, it is preferred to specify the copy length (e.g., in pages), which would define a new "Copyback Length" command or parameter. Multiple pages would be read sequentially or randomly, then programmed sequentially to a destination block. However, reading several (>1) pages before the program phase may require more page buffers in the controller. The multi-page copy can also be performed as a page-at-a-time (of multipage) copy in background using only one page buffer, in which case the source and destination LUNs would be "busy" per page (or just "background-busy"). As with other background commands, a background copy command can be interrupted by a foreground command), where performance is affected by foreground/background page buffer provisioning/sharing (as will be discussed below).

A command to block or sub-block copy with assembly provision can also be used. In this command, a Scatter Gather List (SGL) can specify multiple source pages and single destination block, where the source LUNs and destination LUN can be the same or different. Pages can be buffered in binary flash pages until "folded" to MLC/3 BitsperCell pages.

As mentioned above, foreground/background buffer management may involve data buffer options to the same LUN, which would handle the scenario of simultaneous foreground operations arriving when a background copy (or other) operation may be in progress on the same LUN. As discussed above, dedicated foreground and background page buffers can be used or a single buffer can be shared between foreground and background commands. Providing dedicated foreground page buffer(s) and background page buffer(s) are more costly. If a foreground command uses a different page buffer than a background command, then the background page buffer can be paused and not "disturbed" during the interrupting foreground operation. This option can cleanly resume when the foreground command is done, and a page buffer re-load is not necessary. On the other hand, sharing the same page buffer between foreground and background commands may reduce performance. A background copy command can be interrupted at page boundaries by foreground commands, and a foreground command either waits until the program portion of a background operation is done with the single LUN buffer or the host foreground command pre-empts the background copy operation. This could pre-empt the read phase of the copy (resumed copy could re-read the source page later) and could allow an abort of the program phase of copy (and re-start the program phase later, in which case the source page would be re-read).

Finally, as mentioned above, the CopyBlock command is an example of a type of command that can be used with these embodiments, and the ReadMetaData command can be used to reading the background operation status of a copy command. The following paragraphs provide more information about these and other copy-related operations.

In one embodiment, CopyList commands provide a mechanism to copy pages from various blocks to a complete block. This can used by the host for compaction of single level cell (SLC) and multi-level cell (MLC) or greater blocks, and to efficiently move data from SLC to MLC or greater. Copies preferably start from the first page of a block and continue to the last page of the block. In one embodiment, there are two types of copylist commands: CopyPage and CopyBlock. CopyPage copies data from SLC to complete destination pages in SLC. Ready is returned after the copy has completed. CopyBlock copies data from SLC and MLC or greater to MLC or greater. Ready for the command is returned as soon as the command has been accepted by the controller and execution of the Copies occurs in the background.

The CopyList commands copy data within a LUN to a complete block. The supported CopyList sources and destinations in one embodiment are given in the table below:

| Command | Source | Destination | Alignment |
|---|---|---|---|
| CopyPage | SLC pages | SLC Block | N/A |
| CopyBlock | SLC pages | MLC or greater block | N/A |
| CopyBlock | MLC or greater pages | MLC or greater block | N/A |
| CopyBackPage | SLC pages | SLC Block | Page/Plane |
| CopyBackBlock | SLC pages | MLC or greater block | Page Plane |
| CopyBackBlock | MLC or greater pages | MLC or greater block | Not Supported |

The CopyList commands copy data within a LUN to a complete block. Complete SLC block programming can occur as a series of CopyPage commands, each starting at the page after where the previous command finished. Complete MLC or greater block programming can occur as a series of CopyBlock commands, each starting at the page after where the previous command finished. To improve the efficiency of the copy operations, internal flash copies can be supported. This saves time and power because the copy occurs within the flash without transferring data on the flash bus and without involving the controller. With internal flash copies, no re-alignment of the data is required. Also, internal flash copies may increase the error propagation, so the controller preferably keeps track of how many internal copies are possible for each page.

To support internal flash copies, the CopyBackPage and CopyBackBlock commands can be supported. The controller can make the final determination if internal copies are possible. The host may combine CopyPage and CopyBackPage commands in succession when programming SLC blocks. Similarly, the host may combine CopyBlock and CopyBackBlock commands when programming MLC or greater clocks.

Status on the progression of the CopyPage and CopyBlock commands can be given by the ReadMetadata command. The ReadMetadata command can return the Metadata for each transfer unit that was copied. For SLC operations, the ReadMetadata command can be available as soon as the previous CopyPage command completes and ready is returned. ReadMetadata can be maintained on the previous N pages copied. Once Metadata is read, the stored Metadata is preferably erased.

For MLC or greater operations, the ReadMetadata command can be used to denote the progress of the operation. A maximum number of outstanding pages is defined as a system parameter (16 default, for example). The controller preferably has the ability to store up to 16 pages of copies internally per open block per LUN (the number of open blocks permitted can be set by buffer space on the controller). As status is returned on copied pages, additional pages to be copied may be transferred to the controller. As long as the number of outstanding pages remains below 16 in this example, commands will be accepted. Should more than 16 pages be transferred to the controller in this example, ready will preferably remain low until the number of outstanding page program operations falls below this threshold. The controller also preferably remains busy until outstanding page program operations to the end of a block have completed. When the end of block is being programmed, a new block command preferably cannot be accepted until the previous block program has completed. Metadata for the block should preferably be read before a new block program is started.

For the copyback commands, since Metadata is not available, only the number of blocks that have been transferred is preferably returned in the ReadMetadata command. This allows the host to determine the number of currently outstanding pages and the number of additional pages it can send for programming. In order to differentiate the Ready status returned for the CopyBlock commands, these commands can use CE1, as opposed to the other commands that are given with CE0. This allows foreground operations such as regular program and reads to continue while the copyBlock commands execute in the background.

While a CopyList command is in process, the host preferably does not program the destination block or any of the source pages. Reads of the pages in the source blocks are preferably permitted. A Read command which is directed to an address in an MLC or greater block that is open for programming and for which a copy block operation is outstanding is executed preferably only if programming of that block has been completed; otherwise, error status is preferably returned for the command.

For the CopyBlock and CopyList commands, validity checks are preferably made before accepting the command; otherwise, the command is preferably returned with a command sequence error. If the CopyBlock destination block is already active, it is preferred to check that the destination page is the next contiguous page of the previous Copyblock command on this block.

CONCLUSION

It is intended that the foregoing detailed description be understood as an illustration of selected forms that the invention can take and not as a definition of the invention. It is only the following claims, including all equivalents that are intended to define the scope of this invention. Also, some of the following claims may state that a component is operative to perform a certain function or configured for a certain task. It should be noted that these are not restrictive limitations. It should also be noted that the acts recited in the claims can be performed in any order—not necessarily in the order in which they are recited.

What is claimed is:

1. A controller comprising:
   a first interface through which to communicate with a host;
   a second interface through which to communicate with a plurality of flash memory devices, wherein at least one of the flash memory devices comprises a three-dimensional memory, wherein the three-dimensional memory comprises a plurality of layers of memory cells stacked vertically above one another;
   a memory configured to store a plurality of background commands, wherein the background commands are for operations to be performed in one or more of the plurality of flash memory devices;
   a processor in communication with the first and second interfaces and the memory, wherein the processor is operative to:
      perform a foreground command received from the host via the first interface, wherein the foreground command is for an operation to be performed in one or more of the plurality of flash memory devices, and wherein the processor performs the foreground command to completion without interruption;
      perform a background command stored in the controller's memory, wherein the processor performs the background command until completed or preempted by a foreground command; and
      if the background command is preempted, resume performing the background command at a later time; and
   an error correction code module configured to correct errors in portions of a page of data as the portions are read from the plurality of flash memory devices instead of waiting for the entire page of data to be read from the plurality of flash memory devices before correcting the errors;
   wherein a foreground command has a predetermined completion time, whereas a background command does not;
   wherein at least one of the first and second interfaces comprises a NAND interface configured to transfer data using a NAND interface protocol; and
   wherein the foreground command or the background command is a command to program a page of data to a block of memory in the plurality of flash memory devices, and wherein in response to a failure in programming the page of data to the block of memory in the plurality of flash memory devices, the processor is further configured to copy that page and preceding pages in the block to a replacement block in the plurality of flash memory devices.

2. The controller of claim 1, wherein at least one of the background commands stored in the controller's memory is received from the host via the first interface.

3. The controller of claim 1, wherein at least one of the background commands stored in the controller's memory is generated by the processor.

4. The controller of claim 1, wherein a foreground command comprises a read command, a write command, or an erase command.

5. The controller of claim 1, wherein a background command comprises one or more of the following commands: a copy command, a move command, a data scrambling command, a column replacement command, a command to handle write aborts, a command to handle program failures, a read scrubbing command, a wear leveling command, a bad block management command, a spare block management command, an error detection code (EDC) command, a status command, an encryption command, an error recovery command, and an address mapping command.

6. The controller of claim 1, wherein the processor is further operative to provide independent command status indicators for foreground and background commands.

7. The controller of claim 1, wherein the processor is further operative to arbitrate conflicting foreground and background commands according to a set of rules.

8. The controller of claim 1, wherein the processor is further operative to apply a set of coherency rules for simultaneous foreground and background commands.

9. The controller of claim 1, wherein the processor is further operative to execute foreground and background commands according to specified response times.

10. The controller of claim 1 further comprising one or more data buffers, and wherein the processor is further operative to manage use of the one or more data buffers for foreground and background commands.

11. The controller of claim 1, wherein the processor is further operative to distinguish between foreground and background commands sent over a single-level Open NAND Flash Interface (ONFI) bus.

12. The controller of claim 1, wherein the processor is further operative to provide independent flash-memory-device busy indicators for foreground and background commands.

13. The controller of claim 1, wherein the first interface is configured to receive multiple read or write requests for individual pages and to simultaneously handle the multiple read or write requests.

14. A method for performing a background operation, the method comprising:
   performing in a controller in communication with a host and at plurality of flash memory devices, wherein at least one of the flash memory devices comprises a three-dimensional memory, wherein the three-dimensional memory comprises a plurality of layers of memory cells stacked vertically above one another;
   performing a foreground command received from the host, wherein the foreground command is for an operation to be performed in one or more of the plurality of flash memory devices, and wherein the controller performs the foreground command to completion without interruption;
   performing a background command stored in the controller's memory, wherein the background command is for an operation to be performed in one or more of the plurality of flash memory devices, and wherein the controller performs the background command until completed or preempted by a foreground command;
   if the background command is preempted, resuming performing the background command at a later time; and
   correcting errors in portions of a page of data as the portions are read from the plurality of flash memory devices instead of waiting for the entire page of data to be read from the plurality of flash memory devices before correcting the errors;
   wherein a foreground command has a predetermined completion time, whereas a background command does not;
   wherein at least one of the first and second interfaces comprises a NAND interface configured to transfer data using a NAND interface protocol; and
   wherein the foreground command or the background command is a command to program a page of data to a block of memory in the plurality of flash memory devices, and wherein in response to a failure in programming the page of data to the block of memory in the plurality of flash memory devices, the processor is further configured to copy that page and preceding pages in the block to a replacement block in the plurality of flash memory devices.

15. The method of claim 14, wherein at least one of the background commands stored in the controller's memory is received from the host.

16. The method of claim 14, wherein at least one of the background commands stored in the controller's memory is generated by the controller.

17. The method of claim 14, wherein a foreground command comprises a read command, a write command, or an erase command.

18. The method of claim 14, wherein a background command comprises one or more of the following commands: a copy command, a move command, a data scrambling command, a column replacement command, a command to handle write aborts, a command to handle program failures, a read scrubbing command, a wear leveling command, a bad block management command, a spare block management command, an error detection code (EDC) command, a status command, an encryption command, an error recovery command, and an address mapping command.

19. The method of claim 14, wherein the controller is operative to provide independent command status indicators for foreground and background commands.

20. The method of claim 14, wherein the controller is operative to arbitrate conflicting foreground and background commands according to a set of rules.

21. The method of claim 14, wherein the controller is operative to apply a set of coherency rules for simultaneous foreground and background commands.

22. The method of claim 14, wherein the controller is operative to execute foreground and background commands according to specified response times.

23. The method of claim 14, wherein the controller comprises one or more data buffers, and wherein the controller is operative to manage use of the one or more data buffers for foreground and background commands.

24. The method of claim 14, wherein the controller is further operative to distinguish between foreground and background commands sent over a single-level Open NAND Flash Interface (ONFI) bus.

25. The method of claim 14, wherein the controller is further operative to provide independent flash-memory-device busy indicators for foreground and background commands.

26. The method of claim 14, wherein the first interface is configured to receive multiple read or write requests for individual pages and to simultaneously handle the multiple read or write requests.

* * * * *